(12) United States Patent
Clark et al.

(10) Patent No.: US 10,328,498 B2
(45) Date of Patent: Jun. 25, 2019

(54) INFINITY JOINT JIG, PLUG, AND METHOD OF USE

(71) Applicant: Kreg Enterprises, Inc., Huxley, IA (US)

(72) Inventors: Scott L. Clark, Boone, IA (US); Scott Schaaf, Huxley, IA (US)

(73) Assignee: KREG ENTERPRISES, INC., Huxley, IA (US)

( * ) Notice: Subject to any disclaimer, the term of this patent is extended or adjusted under 35 U.S.C. 154(b) by 733 days.

(21) Appl. No.: 14/685,862

(22) Filed: Apr. 14, 2015

(65) Prior Publication Data

US 2015/0298217 A1 Oct. 22, 2015

Related U.S. Application Data

(60) Provisional application No. 61/980,409, filed on Apr. 16, 2014.

(51) Int. Cl.
| | | |
|---|---|---|
| *F16B 5/06* | (2006.01) | |
| *F16B 7/02* | (2006.01) | |
| *B23B 47/28* | (2006.01) | |
| *F16B 5/00* | (2006.01) | |

(52) U.S. Cl.
CPC ............ *B23B 47/288* (2013.01); *F16B 5/006* (2013.01); *F16B 5/0614* (2013.01); *F16B 7/02* (2013.01)

(58) Field of Classification Search
CPC ...... B23B 47/288; F16B 5/006; F16B 5/0614; F16B 7/02; B27C 3/00; B27C 3/02; B27C 3/04; B27C 3/06; B27C 3/08

USPC ............ 144/134, 353, 135.2; 269/1; 33/638, 33/562, 566
See application file for complete search history.

(56) References Cited

U.S. PATENT DOCUMENTS

| | | | | |
|---|---|---|---|---|
| 4,057,358 A | * | 11/1977 | Young .................. | B23B 47/288 144/35.1 |
| 5,094,279 A | * | 3/1992 | Dickey ................ | B23Q 9/0078 144/135.2 |

(Continued)

OTHER PUBLICATIONS

Woodpeckers Youtube (https://www.youtube.com/watch?v=aKyBPOa6mw8) PUB—Feb. 23, 2011.*

(Continued)

*Primary Examiner* — Jessica Cahill
*Assistant Examiner* — Smith Oberto Bapthelus
(74) *Attorney, Agent, or Firm* — Christopher A. Proskey; BrownWinick Law Firm

(57) ABSTRACT

An infinity jig, infinity plug and a method of forming an infinity joint is presented. The infinity jig has a base with a work surface and an upright with a work surface connected to the base at an approximate perpendicular alignment. The upright includes a plurality of drill guides that are positioned such that a portion of a drill bit inserted into the drill guide extends below the work surface of the base. An infinity hole is formed by using a drill bit having a stop collar to drill partially into a workpiece with a portion of the drill bit exiting a connecting surface of the work piece. To form an infinity joint, two workpieces having infinity holes therein are aligned with one another and an infinity plug is inserted in the aligned infinity holes. The infinity plug pulls the two workpieces together providing a tight and aesthetically pleasing joint.

21 Claims, 9 Drawing Sheets

(56) References Cited

U.S. PATENT DOCUMENTS

| | | | |
|---|---|---|---|
| 5,396,937 A * | 3/1995 | Clausen | B23Q 11/0046 |
| | | | 144/134.1 |
| 5,954,461 A * | 9/1999 | Lemieux | B23B 47/288 |
| | | | 408/115 R |
| 6,481,937 B1 | 11/2002 | Sommerfeld et al. | |
| 7,641,425 B2 * | 1/2010 | Sommerfeld | B23B 47/287 |
| | | | 269/224 |
| 8,083,443 B1 | 12/2011 | Circosta et al. | |
| 8,231,313 B2 | 7/2012 | Sommerfeld et al. | |
| 8,376,333 B2 * | 2/2013 | Zander | B23B 47/287 |
| | | | 269/1 |
| 2005/0089381 A1 | 4/2005 | Liu et al. | |
| 2008/0226406 A1 | 9/2008 | Chiang | |

OTHER PUBLICATIONS

Hoffmann Machine Company; Introduction to Dovetail Keys; 2015; http://hoffmann-usa.com/intro-to-dovetail-keys.

* cited by examiner

INFINITY JOINT JIG, PLUG, AND METHOD OF USE

CROSS REFERENCE TO A RELATED APPLICATION

This application claims the benefit of U.S. Provisional Application No. 61/980,409 filed Apr. 16, 2014.

FIELD OF THE INVENTION

This invention relates generally to drilling jigs. More specifically, and without limitation, this invention relates to drilling systems and methods of joining two pieces of material together, such as two pieces of wood.

BACKGROUND OF INVENTION

Wood working and joining two pieces of wood together is old and well known in the art. Various methods of joining two pieces of wood together have been developed, as has various devices to speed the assembly process and improve the accuracy and precision of joinery.

One such method of joining two pieces of wood is known as a dovetail joint. While dove tail joints are popular, provide a strong and durable connection, and work well in various applications, such as joining two pieces of wood at a 90 degree corner, dove tail joints have their disadvantages. Namely, dovetail joints are difficult to form and are unforgiving if cuts are made inaccurately. In addition, dovetail joints require complicated and expensive tooling and machinery to create and a substantial amount of practice and skill to perfect.

Another such method of joining two pieces of wood is known as pocket hole joinery which involves joining boards by inserting a fastener at an angle through the edge of one board into the other. Various pocket hole jigs have been developed to form pocket hole joints. One such device is presented in U.S. Pat. No. 6,481,937 entitled "Adjustable Holding Device" with the first named inventor Craig A. Sommerfeld, issued on Nov. 19, 2002 and commonly owned by Applicant and incorporated by reference herein.

Pocket hole joints are commonly used for face frames, cabinet boxes, leg-to-rail joinery in chairs and tables, among countless other applications. While pocket hole joints provide certain advantages, they have too have their deficiencies. Namely, pocket hole joints while being very good for joining two pieces of wood at 90 degrees, pocket hole joints are not as well suited when the two pieces of wood are joined at angles other than perpendicular. In addition, some applications do not allow for an elongated fastener to be used and as such a pocket hole joint is inapplicable. In addition, in some applications, the appearance of a pocket hole joint is visually unacceptable and therefore in these applications a pocket hole joint cannot be used.

Therefore, for the reasons stated above, and for other reasons stated below which will become apparent to those skilled in the art upon reading and understanding the specification, there is a need in the art for an improved method of joining two pieces of wood together, as well as an improved jig for forming this new type of joint.

Thus, an object of the invention is to provide an improved method of joining two pieces of wood together, as well as an improved jig for forming this new type of joint that improves upon the present state of the art.

Another object of the invention is to provide an improved method of joining two pieces of wood together, as well as an improved jig for forming this new type of joint that is easy to use.

Yet another object of the invention is to provide an improved method of joining two pieces of wood together, as well as an improved jig for forming this new type of joint that has a simple design.

Another object of the invention is to provide an improved method of joining two pieces of wood together, as well as an improved jig for forming this new type of joint that is inexpensive to manufacture.

Yet another object of the invention is to provide an improved method of joining two pieces of wood together, as well as an improved jig for forming this new type of that forms a joint that provides forces that help to pull the joined pieces of wood together.

Another object of the invention is to provide an improved method of joining two pieces of wood together, as well as an improved jig for forming this new type of joint that provides an aesthetically pleasing joint.

Yet another object of the invention is to provide an improved method of joining two pieces of wood together, as well as an improved jig for forming this new type of joint that is unique.

Another object of the invention is to provide an improved method of joining two pieces of wood together, as well as an improved jig for forming this new type of joint that is robust.

Yet another object of the invention is to provide an improved method of joining two pieces of wood together, as well as an improved jig for forming this new type of joint that is forgiving in nature.

Another object of the invention is to provide an improved method of joining two pieces of wood together, as well as an improved jig for forming this new type of joint that can be easily formed in workpieces that join at an angle, other than perpendicular.

Yet another object of the invention is to provide an improved method of joining two pieces of wood together, as well as an improved jig for forming this new type of that can be used on workpieces having a broad range of thicknesses.

Another object of the invention is to provide an improved method of joining two pieces of wood together, as well as an improved jig for forming this new type of joint that is durable.

Yet another object of the invention is to provide an improved method of joining two pieces of wood together, as well as an improved jig for forming this new type of joint that has a long useful life.

Another object of the invention is to provide an improved method of joining two pieces of wood together, as well as an improved jig for forming this new type of joint that can be used by beginners through experts.

Yet another object of the invention is to provide an improved method of joining two pieces of wood together, as well as an improved jig for forming this new type of joint that is enjoyable to use.

Another object of the invention is to provide an improved method of joining two pieces of wood together, as well as an improved jig for forming this new type of joint that provides a unique finished appearance.

These and other objects, features, or advantages of the invention will become apparent from the specification and claims.

SUMMARY OF THE INVENTION

An infinity jig, an infinity plug and a method of forming an infinity joint is presented. The infinity jig has a base with a work surface and an upright with a work surface connected to the base at an approximate perpendicular alignment. The upright includes a plurality of drill guides that are positioned such that a portion of a drill bit inserted into the drill guide extends below the work surface of the base. An infinity hole is foamed by using a drill bit having a stop collar to drill partially into a workpiece with a portion of the drill bit exiting a connecting surface of the work piece. To form an infinity joint, two workpieces having infinity holes therein are aligned with one another and an infinity plug is inserted in the aligned infinity holes. The infinity plug pulls the two workpieces together thereby providing a tight and aesthetically pleasing joint.

DETAILED DESCRIPTION OF THE INVENTION

Figure 1:
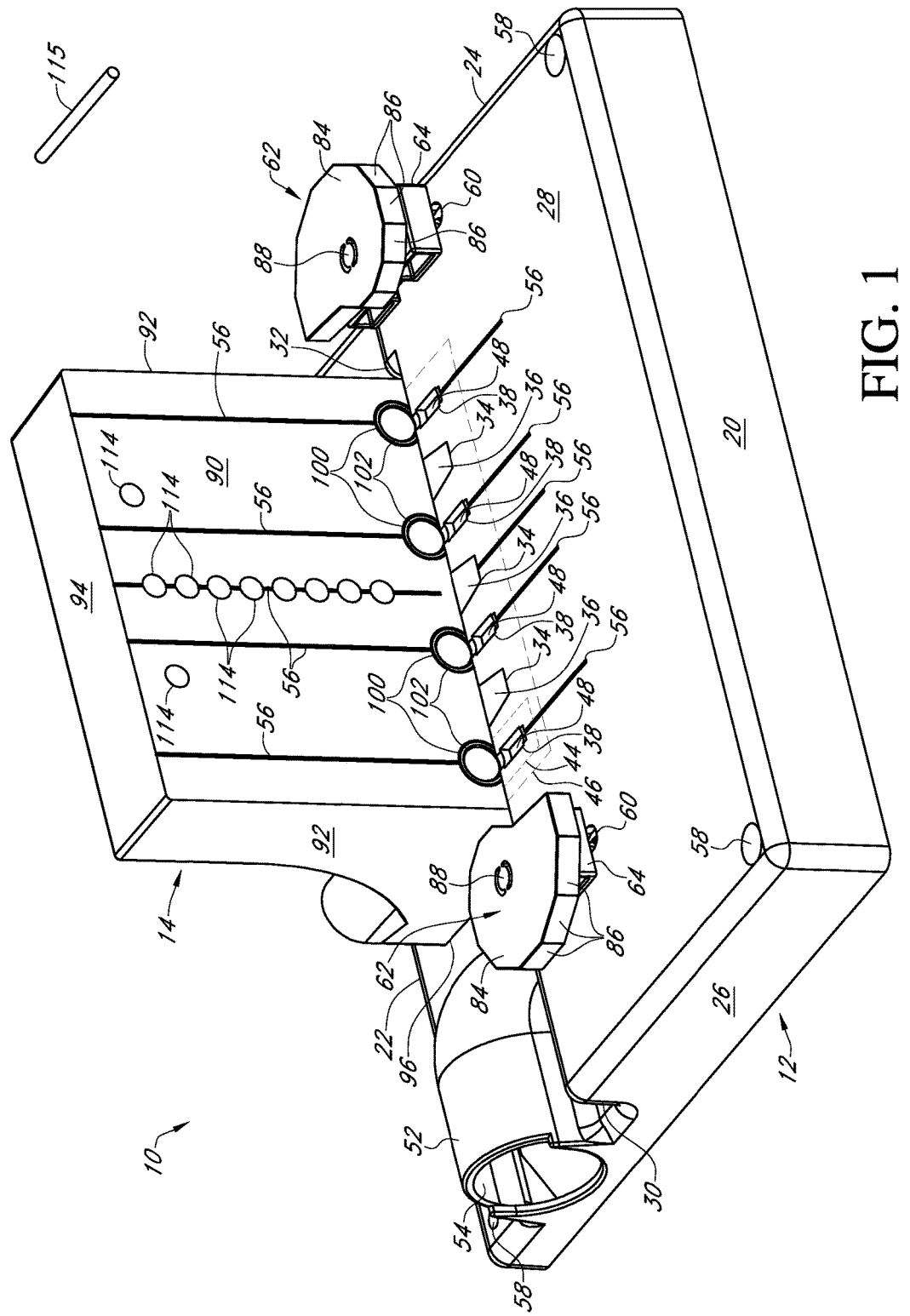
FIG. 1 is a perspective front view of an infinity jig, the view showing an upright connected to a base, a pair of adjustable stops connected to the base adjacent the sides of the upright, the adjustable stops having rotating turrets with a plurality of stop faces, the view also showing the drill guides exiting through the upright and into the base, with a portion of the drill guide below the work surface of the base.
Figure 2:
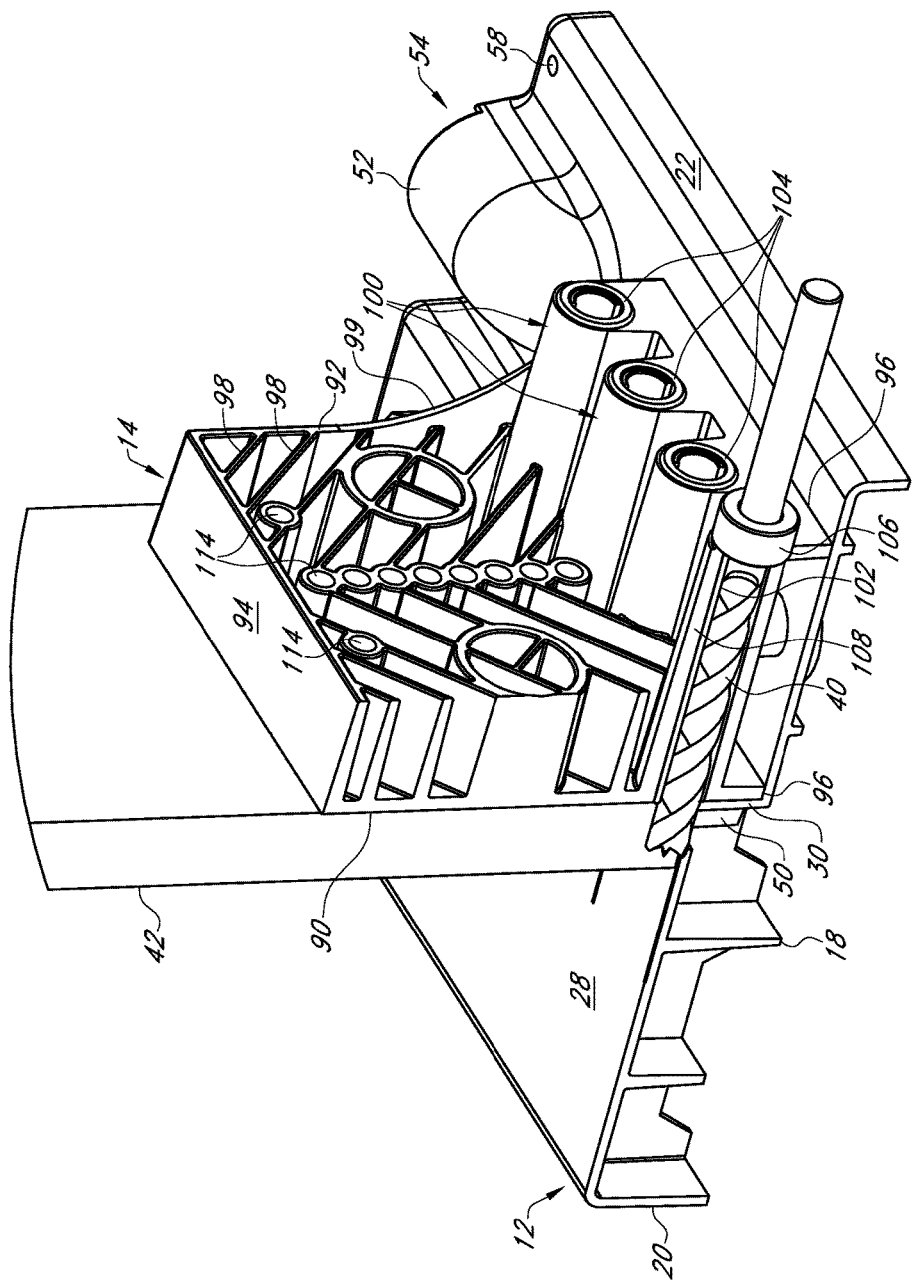
FIG. 2 is a cut-away perspective rear view of an infinity jig, the view showing an upright connected to a base, the view also showing the drill guides exiting through the upright and into the base, with a portion of the drill guide below the work surface of the base, the view also showing a work piece positioned on the jig with the connecting surface 122 engaged with the work surface of the base and the work piece flush against the work surface of the upright and the workpiece extending upward along the upright, the view also showing a drill bit drilling an infinity hole in the work piece.
Figure 3:
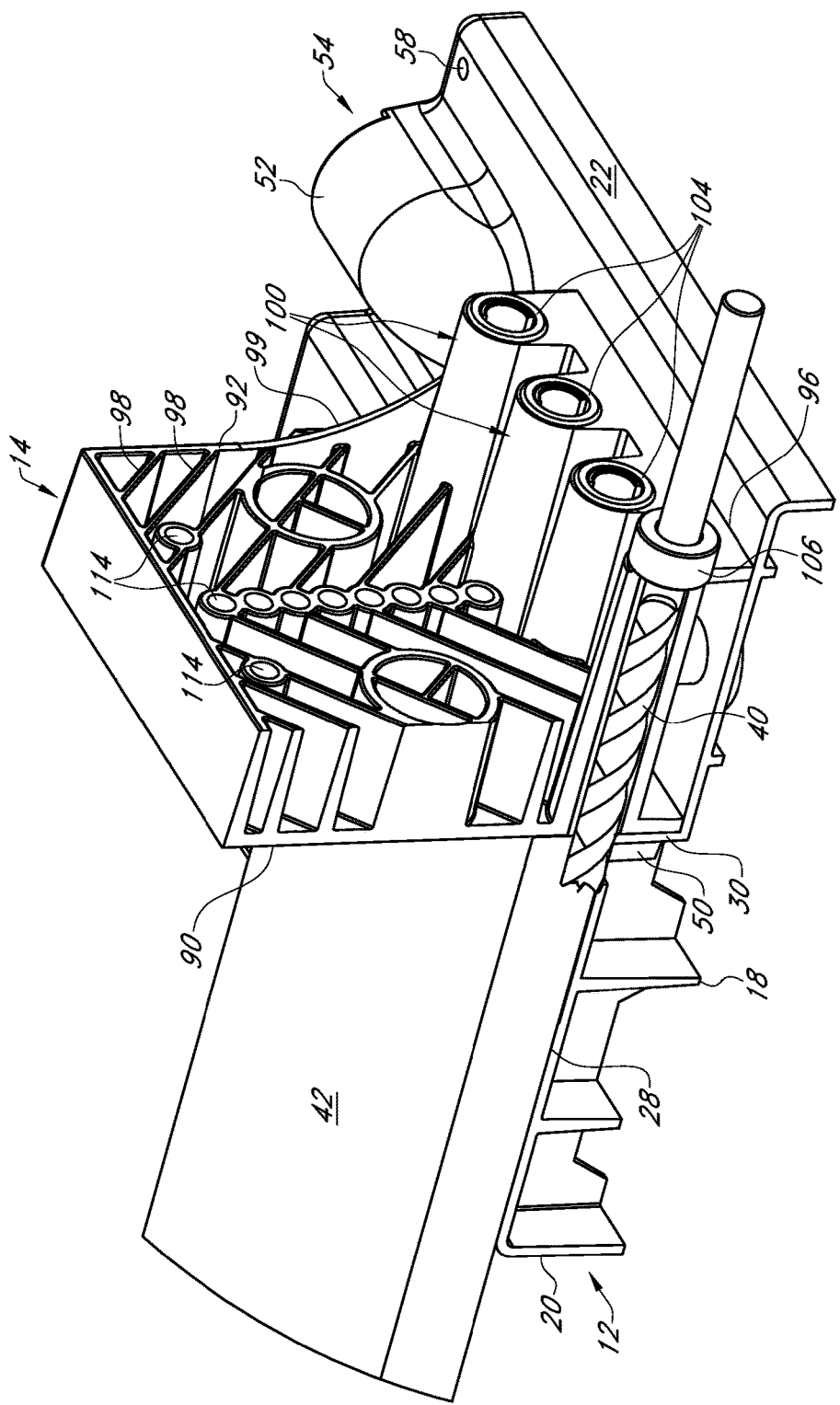
FIG. 3 is a cut-away perspective rear view of an infinity jig like FIG. 2, with the workpiece extending outward from the upright.
Figure 4:
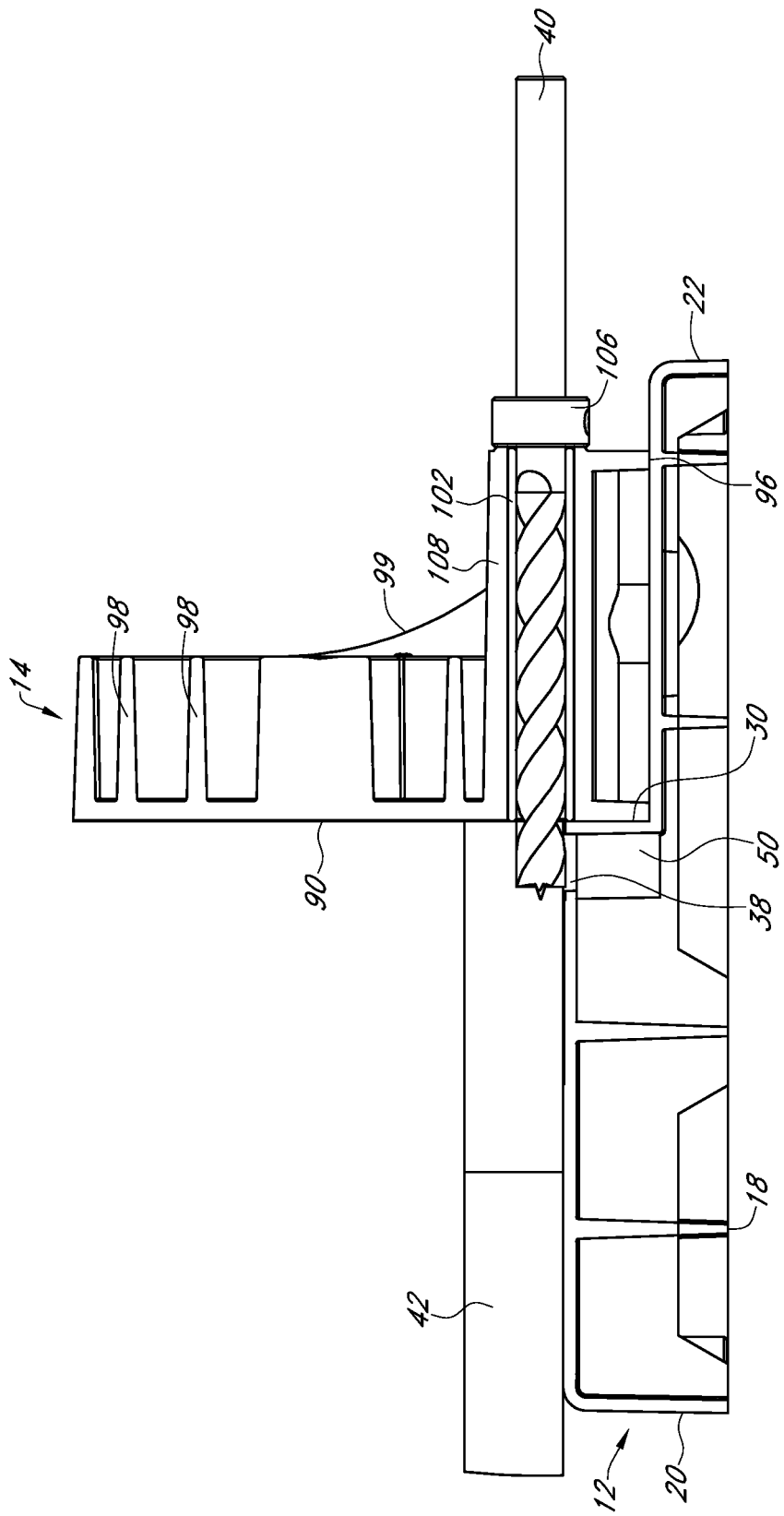
FIG. 4 is side cut-away elevation view of FIG. 3.
Figure 5:
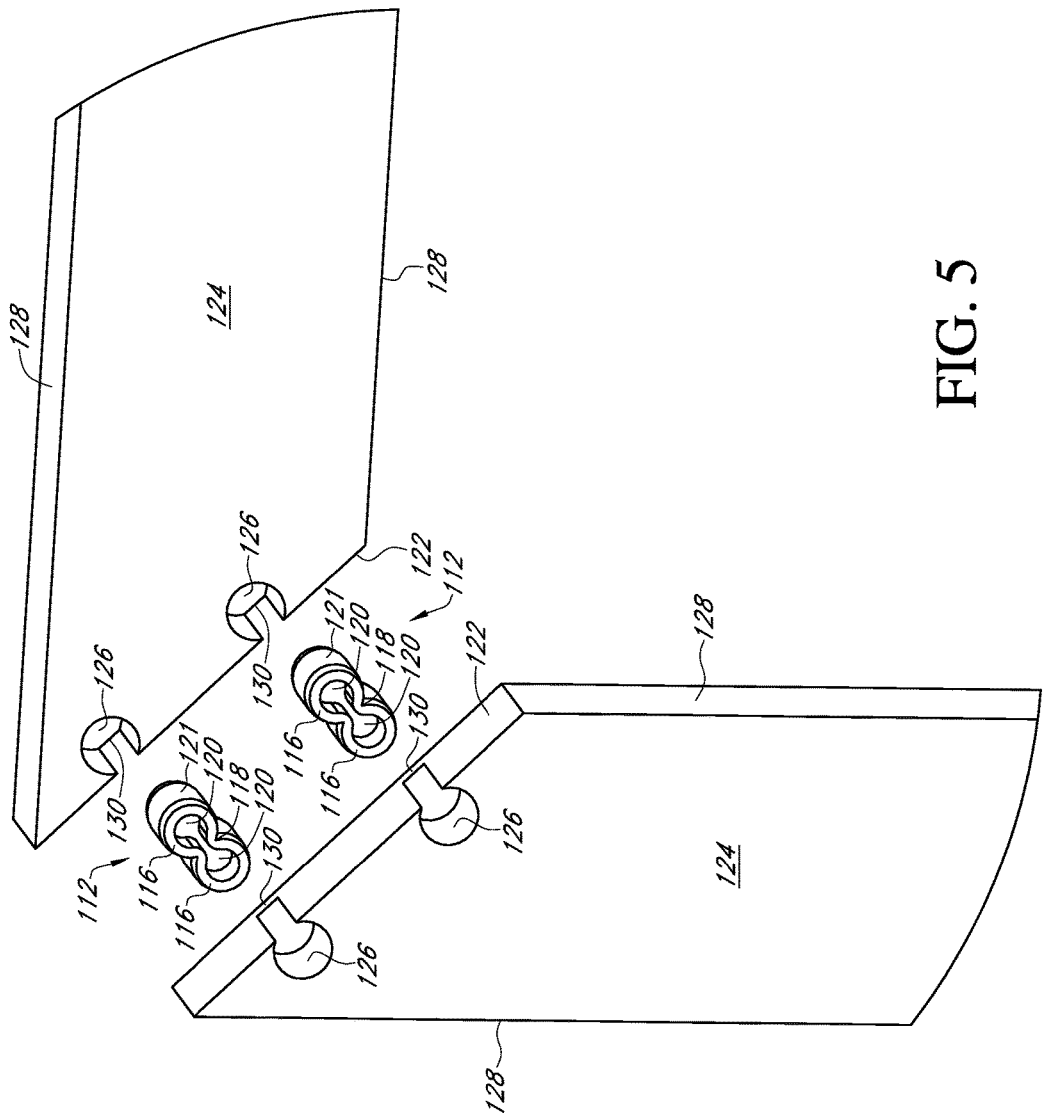
FIG. 5 is an exploded perspective view of a pair of work pieces with infinity holes drilled in their connecting surfaces and a pair of infinity plugs aligned with the infinity holes, the work pieces to be connected at an angled cut extending between two perpendicularly aligned workpieces.
Figure 6:
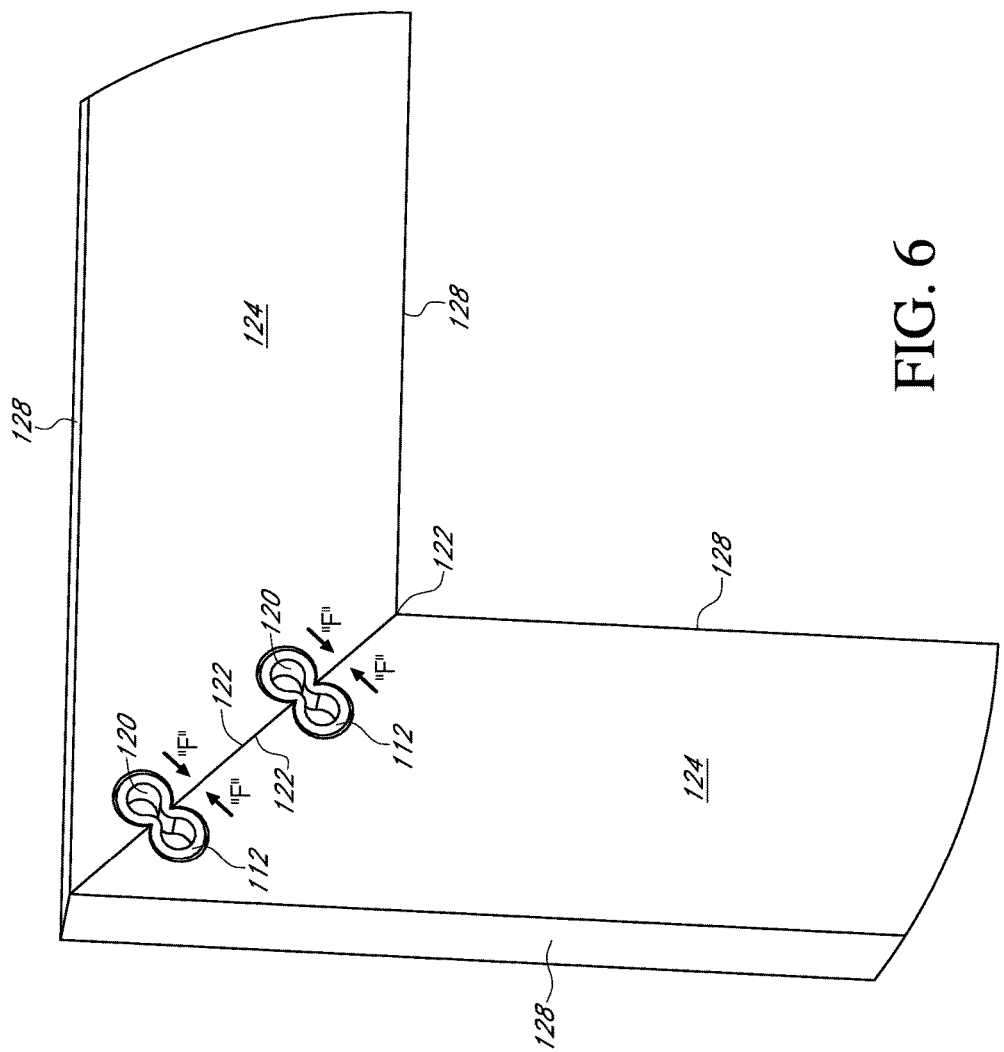
FIG. 6 is a perspective view of FIG. 5 with the infinity plugs inserted within the infinity holes of the workpieces thereby forming an infinity joint.
Figure 7:
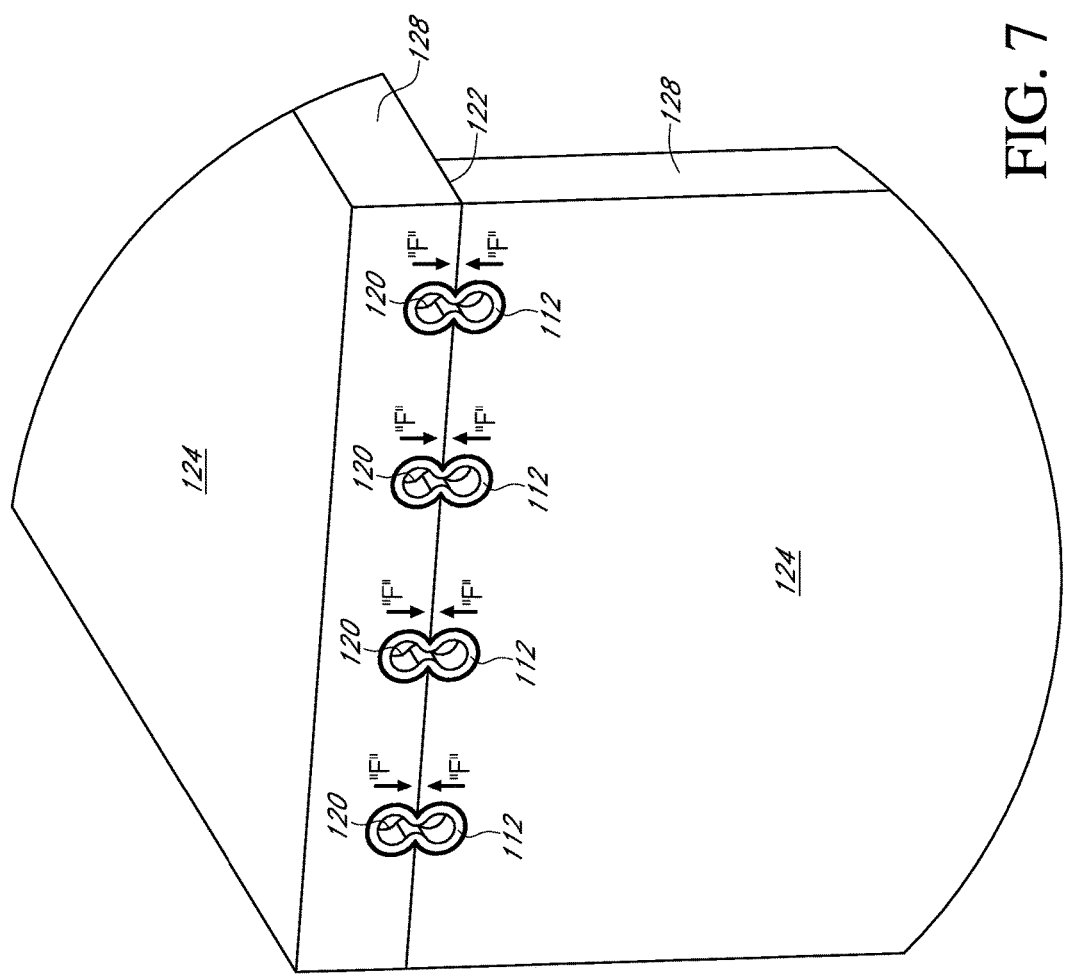
FIG. 7 is a perspective view of a pair of work pieces joined together in end-to-end perpendicular alignment at a straight edge using four infinity joints.
Figure 8A:
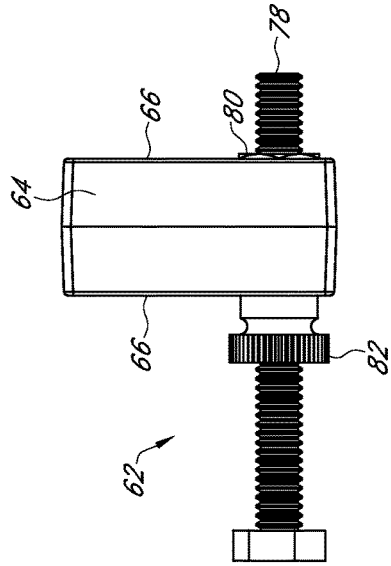
FIG. 8A is a side elevation view of an adjustable stop having stop mounting features that engage mounting features in the base, the view also showing a stop bolt and a threaded stop collar.
Figure 8C:
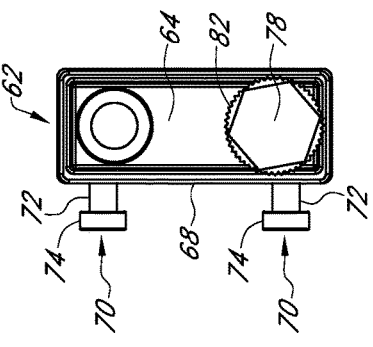
FIG. 8C is a top elevation view showing the adjustable stop of FIGS. 8A and 8B.
Figure 8B:
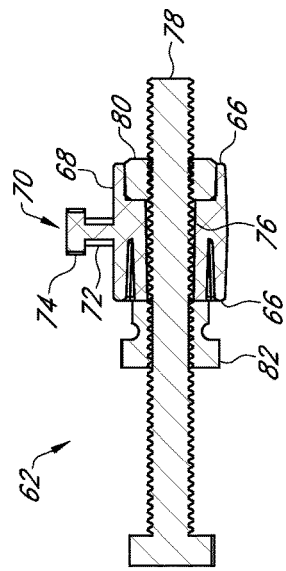
FIG. 8B is an end elevation view of the adjustable stop of FIG. 8A, the view showing the stop bolt partially inserted through the body of the adjustable stop, and the stop collar engaged with the side of the adjustable stop.
Figure 8D:
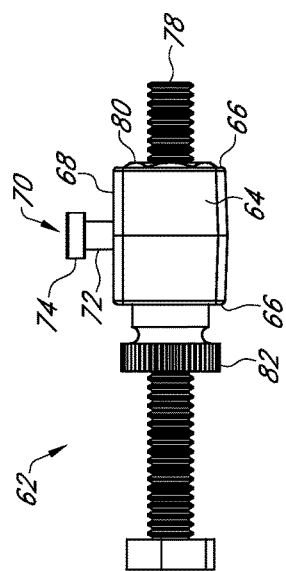
FIG. 8D is a cut-away elevation view of FIG. 8B, the view showing the stop bolt extending through the body of the adjustable stop.
Figure 9:
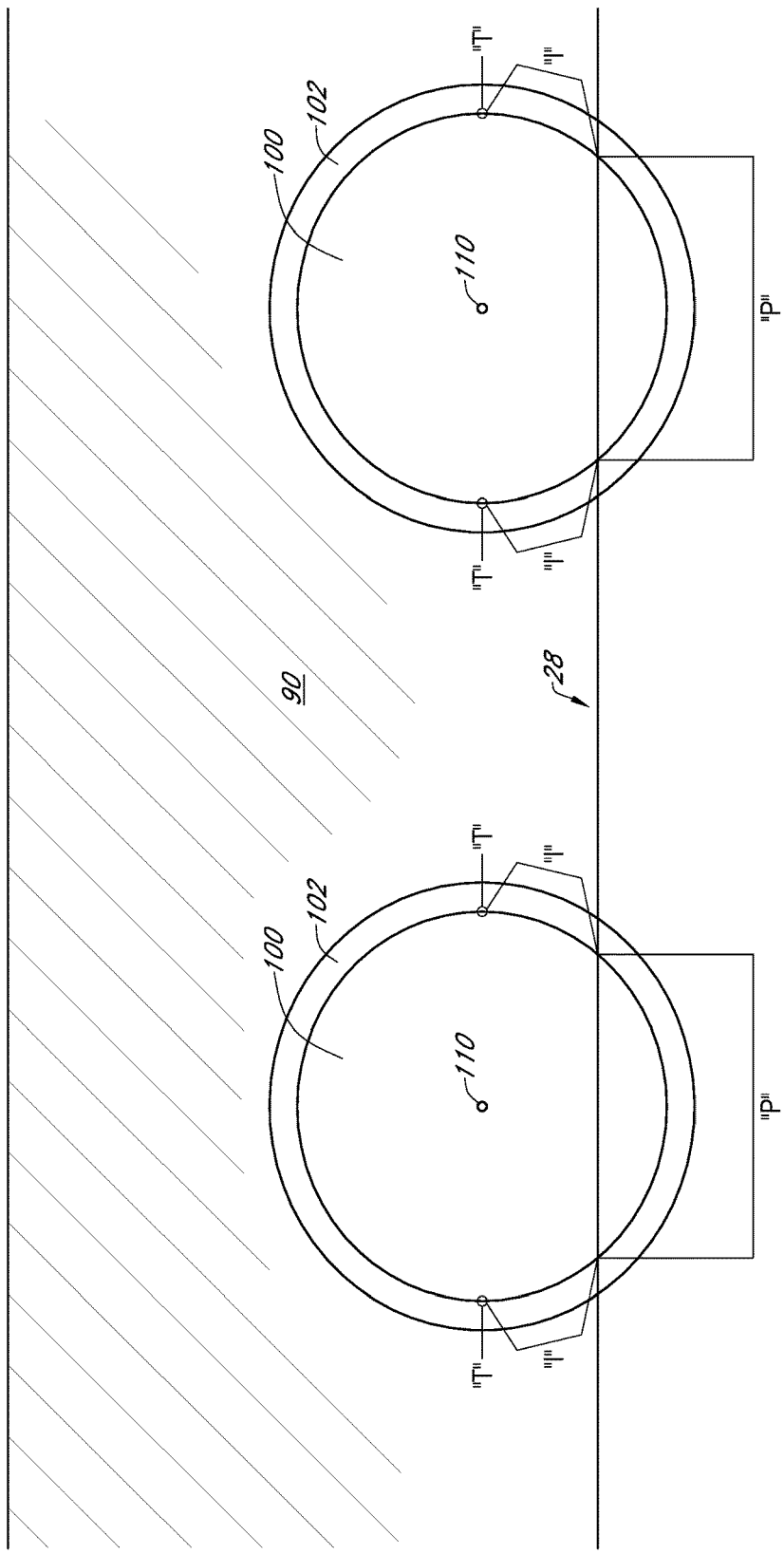
FIG. 9 is a side elevation view of a pair of guide channels, and drill guides, the view showing how the guide channels and drill guides are positioned partially below the work surface of the base, the view showing the exit portion "P" of guide channels, the tangent points "T" of the guide channels and the inwardly sloping portion "I" of the guide channels that form an infinity hole of an infinity joint.

In the following detailed description, reference is made to the accompanying drawings which form a part hereof, and in which is shown by way of illustration specific embodiments in which the invention may be practiced. These embodiments are described in sufficient detail to enable those skilled in the art to practice the invention, and it is to be understood that other embodiments may be utilized and that mechanical, procedural, and other changes may be made without departing from the spirit and scope of the invention(s). The following detailed description is, therefore, not to be taken in a limiting sense, and the scope of the invention is defined only by the appended claims, along with the full scope of equivalents to which such claims are entitled.

As used herein, the terminology such as vertical, horizontal, top, bottom, front, back, end and sides are referenced according to the views presented. It should be understood, however, that the terms are used only for purposes of description, and are not intended to be used as limitations. Accordingly, orientation of an object or a combination of objects may change without departing from the scope of the invention.

In addition, while the system presented herein is described for use with wood working, the system is not limited to use with wood. Instead, reference to woodworking is merely one of countless applications. It is contemplated that the system may be used with any material.

With reference to the Figures, an infinity joint jig system 10 is presented. The system 10 includes a base 12 and an upright 14. The upright 14 is removably and replaceably connected to the base 12 by any manner or method known in the art, such as passing conventional fasteners, such as screws or bolts, through one or both components 12, 14; using snap fit features, or the like. By upright 14 being removable, allows for different attachments to be added in place of upright 14 thereby expanding the possible uses for base 12. In one arrangement, upright 14 is removably attached to base 12 by a plurality of conventional fasteners that extend upwardly from base 12 and into the upright 14, thereby connecting the two components together.

Base: In the arrangement shown, base 12 is generally square or rectangular in shape, however any other shape is hereby contemplated for use. In the arrangement shown, base 12 has a top surface 16 and opposing bottom surface 18, which establish generally parallel planar opposing surfaces that extend in relation to one another. Base 12 has a front wall 20 and an opposing back wall 22, which extend in generally parallel planar spaced relation to one another, and opposing left sidewall 24 and right sidewall 26, which extend in generally parallel planar spaced relation to one another. Front wall 20 and back wall 22 intersect with left sidewall 24 and right sidewall 26 at approximate perpendicular intersections, thereby defining a relatively square or rectangular base.

The top surface 16 of base 12 adjacent the front wall 20 has an extended planar work surface 28 upon which a workpiece 28 can be placed. This extended flat, planar and level work surface 28 allows for placement of workpieces in a flat, flush and stable alignment for working.

Base 12 includes a downward step 30 just rearward of work surface 28. Step 30 extends approximately perpendicularly across base 12, either entirely or partially from left sidewall 24 to right sidewall. The portion of base 12 rearward of step 30 is vertically thinner than work surface 28. A recess or notch 32 is positioned in step 30 which extends into work surface 28 toward front wall 20. Notch 32 extends laterally a distance between left sidewall 24 and right sidewall 26 which is sized and shaped to approximately match the lateral width of upright 14, such that upright 14 fits within recess or notch 32 within close and tight tolerances. The combination of the step 30 and notch 32 provide for alignment of upright 14, which is added therein.

To provide further alignment of upright 14, a plurality of alignment recesses 34 extend inward into work surface 28 which are positioned within notch 32. These alignment recesses 34 are formed of any suitable size, shape and design and receive a corresponding alignment features 36 of upright 14. In the arrangement shown, alignment recesses 34 and alignment features 36 are trapezoidal in shape, however any other shape is hereby contemplated such as square, rectangular, round, triangular or the like. While three sets of alignment recesses 34 and alignment features 36 are shown, any number of alignment recesses 34 and alignment features 36 may be used and are hereby contemplated for use such as one, two, four, five, six, seven, eight, nine, ten, or more. When the upright 14 is in fully installed position upon base 12, the upper surface of the alignment features 36 are in flush and flat planar alignment with the work surface 28 or do not protrude above work surface 28. In an alternative arrangement, alignment features 36 are pegs or posts that are inserted into alignment recesses 34, such as square or round openings, that extend inward into notch 32 and are recessed below the work surface 28 so as not to interfere with the work surface 28.

Work surface 28 also includes a plurality of drill bit cut outs 38. Drill bit cut outs 38 extend into the work surface 28 a distance in approximate parallel spaced alignment to one another and in parallel spaced alignment to the plane of work surface 28. Drill bit cut outs 38 are sized to receive only a portion of the end of a drill bit 40. Drill bit cut outs 38 are sized and shaped to closely fit or cradle the portion of the end of drill bit 40 that extends there into. This close tolerance, and tight fit, helps to provide good, clean, repeatable and reproducible infinity drill holes in a workpiece 42 by preventing what is known as tear-out. That is, by having the edges of drill bit cut outs 38 closely fit the end of drill bit 40 when it enters the edge of work piece 42, during a drilling operation, the edges of drill bit cut outs 38 help to prevent the edges of the workpiece 42, adjacent the cut, from splintering, tearing or breaking away, thereby providing good, clean, repeatable and reproducible infinity drill holes.

In one arrangement, the area 44 around the drill bit cut outs 38 is formed of a metallic material, or hardened metallic material (as opposed to the plastic, nylon, fiberglass or any other non-metallic or composite material which the majority of the base 12 is formed of). The use of this hardened or metallic material provides increased durability, extended life, increased wear resistance, tighter tolerances and a more-finished product. In this arrangement, area 44 may be formed of a hardened metallic insert positioned within the base 12. Alternatively, drill bit cut outs 38 are formed of the same material as the base 12, such as plastic, nylon, fiberglass or any other non-metallic or composite material. In yet another alternative arrangement, alignment recesses 34, alignment features 36 and drill bit cut outs 38 are all included in step or ledge 46 that extends at a perpendicular alignment to the forward face of upright 14 and includes the drill bit cut outs 38 therein. This ledge 46 may be formed entirely of a metallic material or hardened material, to provide superior wear resistance and accurate and flat upper surface, or alternatively, ledge 46 may be formed of a plastic, nylon, fiberglass or any other non-metallic or composite material (like the majority of the upright), or alternatively yet, this ledge 46 may include hardened inserts for area 44 as is described herein.

A dust collection opening 48 is positioned in each of the drill bit cut outs 38. In the arrangement shown, these dust collection openings 48 are positioned in the bottom of each drill bit cut outs 38 and provide a passageway for wood chips and dust to quickly and easily exit the jig 10 during drilling. These dust collection openings 48 are connected to a passageway 50, or a plurality of passageways 50 positioned within in base 12 which are connected to vacuum snout 52.

Vacuum snout 52 terminates in a conventional opening 54 to which a conventional vacuum hose or nozzle (not shown) is connected. In this way, during drilling, a user attaches a conventional vacuum to snout 52, and when the user drills, chips and dust exit the dust collection openings 48, pass through the passageway(s) 50 and out of jig 10 through opening 54 in snout 52. This arrangement accomplishes at least two objective, first by quickly exiting the chips and dust this improves the quality of the infinity holes drilled by preventing the chips or dust to build up in the drilled hole or interfere with the drilling operation, and second this improves the cleanliness of using the jig by quickly and easily vacuuming away most or all of the dust and chips formed by using the jig 10. In the arrangement shown, the vacuum snout 52 conveniently exits to a side 24, 26 of the jig 10 so as to prevent user interference during operation.

Base 12 also includes alignment indicia 56 therein or thereon. In one arrangement alignment indicia 56 are formed as lines or recesses in the work surface 28. These alignment indicia 56 extend in parallel alignment with the center of drill bit cut outs 38, and the axis of rotation of the drill bit 40 and thereby show the location of the center of where the drill bit 40 will go. In addition, a center alignment indicia 56 is positioned at the middle of the work surface 28 to indicate the center of the jig 10. Alignment indicia 56 help the user to align the workpiece 42 and provide a visual double-check to ensure the location of the workpiece 42 is correct prior to drilling.

Base 12 also includes a plurality of sockets 58 therein. Sockets 58 are any feature that allows base 12 to be quickly and easily mounted to a work bench or other surface. In the arrangement shown, a socket 58 is positioned in each corner of the base 12 and includes a recess which receives the head of a conventional fastener, such as a screw, in recessed fashion therein so that the head of the fastener does not interfere with use of the jig 10.

Base mounting features 60 are positioned in base 12 in the work surface 28 adjacent step 30 and are used for mounting an adjustable stop 62 to the jig 10. Base mounting features 60 are formed of any suitable size, shape and design. In the arrangement shown, base mounting features 60 are openings, or more specifically, openings in the work surface 28 that are formed as key-holes with a defend positioned adjacent the transition from the larger opening to the smaller opening of the key hole.

Adjustable Stops: At least one adjustable stop 62 is removeably and replaceably connected to base 12 adjacent step 30 and to the side of upright 14 on the flat upper planar work surface 42. Adjustable stops 62 are formed of any suitable size and shape and design. In one arrangement, as is shown, adjustable stops 62 are formed of a main body 64 which is generally square or rectangular in shape with flat and flush sides 66 which extend in generally parallel spaced relation to one another. The bottom surface 68 of adjustable stop 62 has at least one stop mounting feature 70 extending outwardly and downwardly therefrom which is sized and shaped to be matingly engaged with the base mounting feature 60. In the arrangement shown, stop mounting feature 70 includes a post 72 which is generally cylindrical in shape connected at its end to head 74, which is generally cylindrical in nature or disc shaped with a larger diameter than post 72. As is shown, in one arrangement, a pair of stop mounting features 70 are positioned in alignment along the center of bottom surface 68 of stop 62 which removably and replaceably and lockingly engage a pair of base mounting features 60 positioned in base 12. A corresponding pair of base mounting features 60 and stop mounting features 70 provide greater support and additional strength and improved alignment over using a single base mounting feature 60 and stop mounting feature 70. More than a pair of mounting features 60, 70 can be used for even more additional support and alignment.

Sides 66 of stop 62 includes an aperture 76 that extends through main body 64 in parallel spaced alignment from side 66 to side 66. Aperture 76 is positioned in parallel spaced alignment with the plane of work surface 28 of base 12 and is aligned to extend generally perpendicularly across a lateral width of base 12 when adjustable stop 62 is in position on base 12. A stop bolt 78 is threadably passed through aperture 76. In one arrangement stop bolt 78 threadably engages the material of stop 62. Alternatively a nut pocket and corresponding nut 80 are positioned within aperture 76 which provide improved alignment, durability and rigidity, especially when the nut 80 is made of metallic material and the stop 62 is made of a plastic, nylon, fiberglass or any other non-metallic or composite material. A threaded stop collar 82 is threadably engaged over stop bolt 78 and is used to set the distance or length stop bolt 78 extends out of stop 62. As is shown, a stop 62 is positioned adjacent each lateral side of base 12 such that a stop 62 can be used on the right side and/or left side of a workpiece.

In an alternative arrangement, a different type of stop is used that includes a rotating turret 84 connected to the top surface of main body 64. Turret 84 has a generally planar and when viewed from above or below has the shape of what is known as nautilus spiral, a logarithmic spiral, an equiangular spiral, a growth spiral, or the like. The exterior edge of turret 84 has a plurality of stop faces 86, each stop face 86 being a different distance from the center axis 88 upon which turret 84 rotates. In one arrangement, these stop faces 86 correspond to standard sizes of workpieces 42, such as 1-inch, 1.5-inch, 2-inch and so on; whereas in another arrangement these stop faces 86 correspond to standard distances from center axis 88 such as ⅛ of an inch, ¼ of an inch, ⅜ of an inch, ½ of an inch, ⅝ of an inch, ¾ of an inch, ⅞ of an inch, 1 inch and so on.

In one arrangement, indicia or markings are placed on turret 84 that identifies the measurement related to stop face 86. In this way, indicia may be used to accurately and quickly set the turret 84 for both adjustable stops 62 positioned on base 12 to ensure both opposing adjustable stops 62 are set to the same stop faces 86 which will ensure the infinity holes are drilled in opposing workpieces 42 at the proper and precise position for proper alignment. In this way, turret 84, like stop bolt 78, defines the outward most point workpiece 42 can travel, thereby providing a stop point or reference point for drilling infinity holes, as is described herein.

Upright: Upright 14 is removably and replaceably connected to base 12. Upright 14 is formed of any suitable size, shape and design. Upright 14 has a generally flat and planar work surface 90. In the arrangement shown, work surface 90 of upright 14 is in perpendicular alignment to work surface 28 of base 12, however any other angle is hereby contemplated. Work surface 90 terminates in generally flat and square sidewalls 92 and a generally flat and square top wall 94 and bottom wall 96, however any other shape or design is contemplated. In the arrangement shown, bottom wall 96 engages the top surface of base 12 rearward of step 30 and within notch 32. The width of upright 14, between opposing sidewalls 92, is approximately the width of notch 32 in base 12, thereby providing locking alignment between the two components.

Work surface 90 of upright 14 also includes alignment indicia 56 as does work surface 28 of base 12. In the arrangement show, the alignment indicia 56 on work surface 90 of upright 14 aligns with the alignment indicia 56 on work surface 28 of base 12. The alignment indicia 56 on work surface 90 of upright 14 indicates the center of each drill bit 40.

In one arrangement, alignment features 36 extend outwardly from work surface 90 of upright 14 at or below the intersection of work surface 28 of base 12. Alternatively, ledge 46 extends outwardly from work surface 90 of upright 14 in line with, slightly above or slightly below the intersection of work surface 28 of base 12. By having the alignment features 36 or ledge 46 extend outwardly from work surface 90, this allows upright 14 to be removed from base 12 and used on a workpiece 42 without base 12. This is because the alignment features 36 or ledge 46 define the intersection between work surface 90 and work surface 28.

Upright 14 is generally square or rectangular in shape, however, the upright 14 becomes wider as it extends downward towards bottom wall 96. A plurality or matrix of support structures 98 are positioned within upright 14 and connect to the rear or inward side of work surface 90, sidewalls 92, top wall 94 and bottom wall 96, thereby interconnecting these components and providing additional strength and rigidity to upright 14 and jig 10. The use of support structures 98 saves material and cost by eliminating the need to use a solid piece of material for upright 14. This also lightens the jig 10.

In addition, supports 99 extend in curved or angled relation from the back side of upright 14 and the lower, rearward portions of upright 14. These supports 99 provide additional strength and rigidity to upright 14 and prevent deflection of upright 14 during a drilling operation. In one arrangement, these supports 99 are known as angle supports or flying buttresses.

A plurality of guide channels 100 are positioned in upright 14 which receive drill bit 40. Guide channels 100 are formed of any suitable size, shape and design. In the arrangement shown, guide channels 100 include a hardened drill guide 102 which is generally cylindrical in shape and sized and shaped to receive drill bit 40 therein with close and tight tolerances thereby providing accurate alignment of the drill bit 40. Upright 14 becomes wider at its base so as to provide adequate length for drill guides 102 to provide adequate and accurate alignment for drill bit 40. The rearward end of drill guides 102 terminate in a stop flange 104 that extends outwardly from drill guide 102. Stop flange 104 provides increased surface area to engage a stop collar 106 connected to drill bit 40. This increased surface area between stop flange 104 and stop collar 106 helps to provide accurate and precise stopping of the drill bit 40 thereby providing accurate cutting of infinity holes. In one arrangement, drill guides 102 and stop flanges 104 are formed of a hardened metallic material to provide durability and long life.

In one arrangement, to provide an exit for wood chips and dust, the drill guides 102 have dust collection openings therein, that are similar to the dust collection openings 48 in drill bit cut outs 38. The dust collection openings in drill guides 102 can be used in concert with the dust collection openings 48 in drill bit cut outs 38, or they can be used to replace the dust collection openings 48 in drill bit cut outs 38.

Each drill guide 102 is connected to the upright 14 by supporting material 108 which surrounds and holds the drill guide 102 in place as well as provides required structural integrity to the jig 10. Drill guides 102 are formed in, inserted in, welded in, screwed in, or adhered to upright 14 and supporting material 108 by any method or means known in the art. In one arrangement, drill guides 102 are placed in a mold and the material of upright 14 is injected and molded around drill guides 102, such as through heat and pressure injection molding.

In the arrangement shown, four drill guides 102 are positioned in parallel spaced alignment to one another across the work surface 90 of upright 14. These drill guides 102 are positioned to extend in parallel spaced alignment to the plane of work surface 28 of base 12, and in perpendicular spaced alignment to the plane of work surface 90 of upright 14. In this positioning, the axis of rotation 110 of drill bit 40, or center of drill guides 102, is positioned a distance above the plane of work surface 28 of base 12. In this position, an exit portion ("P") of the exterior circumference of drill bit 40 extends below the plane of work surface 28 of base 12. That is, the axis of rotation 110 or center of drill guides 102 is positioned above the plane of work surface 28 of base 12, whereas exit portion "P" is below the plane of work surface 28. This exit portion "P" is less than half of the circumference of drill bit 40. It is contemplated that exit portion "P" is any amount of the circumference of drill bit 40 from just less than half of the circumference of drill bit 40 to just over the tangent point of the circumference of drill bit 40 (which may only be a few degrees). In one arrangement the exit portion "P" is approximately ⅛ of the circumference of drill bit 40, or 1/6 of the circumference of drill bit 40, or ¼ of the circumference of drill bit 40, or ⅓ of the circumference of drill bit 40, or 3/8 of the circumference of drill bit 40, or the like. That is, the exit portion "P" is less than the tangent points ("T") of drill bit 40. In this arrangement, by only having exit portion "P" of the drill bit 40 below the plane 28 of base 12, only this exit portion "P" of drill bit 40 exits the workpiece 42 when drilling an infinity hole. This arrangement provides an inwardly sloping portion ("I") between the tangent point "T" and the exit portion "P". Because this inwardly sloping portion "I" narrows as it extends from tangent point "T" to exit portion "P" this prevents an infinity plug 112 from pulling out of the infinity hole.

Upright 14 also includes a plurality of peg holes 114 that extend there through, or intersect with the work surface 90 of upright 14. A plurality of peg holes 114 extend in vertically aligned parallel spaced alignment in line with the center line 56 of upright 14. An additional pair of peg holes 114 are positioned to either side of center line 56. Any number of other peg holes 114 or placement of peg holes 56 is hereby contemplated for use with upright 14. Peg holes 114 receive with mating engagement pegs 115.

When positioned within a peg hole 114, peg 115 provides a stop for a workpiece 42. This is especially helpful for use drilling infinity holes in workpieces 42 that have an angular cut, such as a picture frame.

Infinity Plug: Using jig system 10 an infinity plug 112 is used to join two workpieces 42 together. Infinity plugs 112 are formed of a single piece of material that is formed of a pair of circles or cylinders 116 positioned in overlapping connected condition with one another with a narrower waist 118 positioned therebetween. This overlapping portion is known as a vesica piscis which is known as shape that is the intersection of two circles with the same radius, intersecting in such a way that the center of each circle lies on or outside the perimeter of the other circle.

These infinity plugs 112 can be formed or machined out of a solid piece of material, such as plastic or wood. Alternatively, as is shown, the infinity plugs 112 can have a hollow interior 120 or a partially hollow interior 120, so as to save on material used to form infinity plug 112. When infinity plugs 112 are formed of a solid piece of wood a unique and appealing aesthetic appearance is created when the plugs are formed of one type of wood and the workpieces 42 are formed of another type of wood. However, it is hereby contemplated that infinity plugs 112 may be formed out of any material such as stone, bone, plastic, shell, composite or any other materials.

In one arrangement, the exterior surface 121 of infinity plugs 112 have a roughened or abraded, or textured surface, or toothed surface to provide increased frictional engagement with workpieces 42 to provide greater hold and strength to the joint. In addition, this roughened exterior surface 121 may have flanges or features or teeth that are slightly over-dimensioned so as to ensure a tight frictional fit with the workpiece 42. A roughened or textured exterior surface 121 also provides additional features for adhesive, such as glue, to grip to when used thereby further strengthening the joint.

When viewed from above, the infinity plugs 112 appear to take the shape of a figure-eight, or an infinity symbol, hence the names "infinity plug," "infinity jig," and "infinity joint".

In Operation: In operation, two workpieces 42 are joined together using an infinity plug 112 by first placing the connecting surface 122 of the first workpiece 42 on the work surface 28 of base 12. In this position, the face 124 of the workpiece 42 is then pressed against the work surface 90 of upright 14.

Next, the location of the infinity hole 126 is set by engaging the workpiece 42 with a peg 115 positioned in the desired peg hole 114, or by setting the stop bolt 78 or turret 84 of adjustable stops 62 and engaging an alignment edge 128 of the workpiece 42 with the stop bolt 78 or turret 84 of adjustable stop 62.

The stop collar 106 of drill bit 40 is set to the approximate depth of the infinity plug 112, which, in one arrangement, is up to half or three quarters the thickness of workpiece 42. In some arrangements, it may be desirable to have the drill bit 40 extend all the way through the workpiece 42 such that the infinity plug 112 can be seen on both sides of the workpiece 42, however most of the time it is desirable to not drill all the way through the workpiece 42 thereby leaving a flange 130 of material on one side of the infinity hole.

Once the adjustable stops 62 and stop collar 106 is set on drill bit 40, and the workpiece 42 aligned on jig 10 the infinity holes 126 are drilled by inserting the drill bit 40 into the desired drill guides 102 until stop collar 106 engages stop flange 104. By having a plurality of drill guides 102 in upright 14, this speeds the process of drilling a plurality of infinity holes 126 and improves the accuracy of these infinity holes 126 because the workpiece 42 does not need to be moved to drill multiple infinity holes 126. All that needs to be done is to drill multiple holes using multiple drill guides 102 while the workpiece 42 remains in the same place on the jig 10.

To improve cleanliness and precision, a vacuum is attached to vacuum snout 52. During the drilling operation, as wood chips and dust are formed, they exit through the dust collection opening 48 in drill bit cut outs 38 or drill guides 102, get sucked through passageways 50 and out vacuum snout 52 by a conventional vacuum connected to the opening 54.

To drill matching infinity holes 126 in two adjoining workpieces 42 together, each workpiece 42 is indexed against the opposite side alignment edge 128 and/or the opposite adjustable stop 62. This is because the infinity holes 126 in one workpiece 42 are mirrored on the other workpiece. Alternatively, when using an engagement peg 115 positioned in a selected peg hole 114, the same process is used. That is, one workpiece 42 is engaged on one side of engagement pin 115 and the other workpiece 42 is engaged on the other side of engagement pin 115 when the infinity holes 126 are drilled. This causes the infinity holes 162 on two workpieces 42 to accurately align without measuring.

Once the infinity holes 126 are drilled, the connecting surfaces 122 of workpieces 42 are glued and joined to one another. Next the infinity plugs 112 are frictionally inserted into the infinity holes 126 until the bottom surface of the infinity plug 112 engages the flange 130 at the end of infinity hole 126. In this position, the inward sloping portion "I" of opposing circles or cylinders 116 of infinity plug 112 apply a force along arrow "F" which pulls the two workpieces 42 together towards one another. This force "F" helps to provide a strong and tight bond between the two workpieces 42 and reduces or eliminates the need to clamp the two workpieces 42 as the glue dries. This force "F" also helps to align the two workpieces 42 together.

Flat Drill Bit: In one arrangement, to provide accurate, clean and minimally deep holes, drill bit 40 is designed to have a flat drilling end, generally flat drilling end, or mostly flat drilling end. This is opposed to most common drill bits that have a generally pointed drilling end or substantially pointed drilling end. By having a generally flat drilling end, drill bit 40 forms holes that 42 that are as shallow as possible, or minimally shallow, as opposed to using a substantially pointed drill bit. In addition, by having a generally flat drilling end of drill bit 40, this allows the interior surface of infinity plug 112 to engage the surface of flange 130 in generally flush and flat engagement. In addition, by having a generally flat drilling end of drill bit 40, this allows the depth of the infinity hole 126 to be accurately controlled by setting the stop collar 106.

Accordingly, from the above discussion it will be appreciated that the improved method of joining two pieces of wood together, as well as an improved jig for forming this new type of joint, offers many advantages over the prior art. Specifically, the method and jig presented: improves upon the present state of the art; is easy to use; is simple; is inexpensive; helps to pull the joined pieces of wood together; provides an aesthetically pleasing joint; is unique; is robust; is forgiving; can be easily formed in workpieces that join at an angle, other than perpendicular; can be used on workpieces having a broad range of thicknesses, among countless other improvements and advantages.

It will be appreciated by those skilled in the art that other various modifications could be made to the device without parting from the spirit and scope of this invention. All such modifications and changes fall within the scope of the claims and are intended to be covered thereby.

What is claimed is:

1. A drilling jig comprising:
a base;
the base having a planar work surface;
an upright;
the upright connected to the base;
the upright having a planar work surface;
wherein the planar work surface of the base is positioned in a generally perpendicular orientation to the planar work surface of the upright;
a first drill guide having a center axis extending through the planar work surface of the upright in a generally perpendicular orientation;
wherein the first drill guide is configured to receive a drill bit therein;
wherein the first drill guide is configured to allow the drill bit to rotate within the first drill guide;
wherein the first drill guide is configured to allow the drill bit to move laterally through the first drill guide as the drill bit rotates so as to facilitate drilling a hole into a workpiece;
wherein the first drill guide is aligned to extend in a generally parallel orientation to the planar work surface of the base;
wherein the first drill guide is positioned such that an exit portion of the first drill guide is below the planar work surface of the base;
wherein the exit portion of the first drill guide intersects the planar work surface the base;
wherein the exit portion of the first drill guide is less than half of the circumference of the first drill guide.

2. The drilling jig of claim 1 wherein the exit portion of the first drill guide corresponds to less than half of the circumference of the drill bit.

3. The drilling jig of claim 1 wherein the first drill guide includes a hardened metallic portion for increased durability and wear resistance.

4. The drilling jig of claim 1 wherein the upright is removably connected to the base.

5. The drilling jig of claim 1 wherein the first drill guide includes a dust collection opening for removal of dust and debris.

6. The drilling jig of claim 1 wherein the first drill guide includes a drill bit cut out area positioned in line or below the planar work surface of the base.

7. The drilling jig of claim 1 wherein the first drill guide includes a drill bit cut out area positioned in line or below the planar work surface of the base that is formed of a hardened metallic material for improved wear resistance.

8. The drilling jig of claim 1 wherein the first drill guide includes a drill bit cut out having a dust collection opening.

9. The drilling jig of claim 1 further comprising at least one adjustable stop for positioning a workpiece.

10. The drilling jig of claim 1 further comprising a plurality of holes that receive an engagement peg for selectively positioning a workpiece.

11. The drilling jig of claim 1 further comprising a vacuum snout connected to the drilling jig for removal of dust and debris during use.

12. The drilling jig of claim 1 further comprising a second drill guide positioned in the upright.

13. A method of forming a joint for joining two workpieces, the method comprising the steps of:

providing a drilling jig having:
  a base having a planar work surface;
  an upright having a planar work surface;
  a drill guide having a bore extending through the upright; and
  wherein the bore of the drill guide is aligned to extend parallel to the planar work surface of the base and is positioned such that a portion of the bore of the drill guide is below the planar work surface of the base;
providing a workpiece having a face and a connecting surface, wherein the face and the connecting surface extend in a generally perpendicular orientation to one another;
placing the face of the workpiece onto the planar work surface of the upright;
aligning a cylindrical drill bit having a circumference with the bore of the drill guide;
inserting the drill bit into the bore of the drill guide;
rotating the drill bit within the drill guide;
moving the drill bit laterally along the bore of the drill guide as the drill bit rotates;
drilling a hole into the face of the workpiece wherein a portion of the drill bit exits the connecting surface of the workpiece;
wherein the portion of the drill bit that exits the connecting surface of the workpiece is less than half of the circumference of the drill bit.

14. The method of claim 13, further comprising wherein the face of the workpiece is placed flush against the planar work surface of the upright during the drilling step while the connecting surface of the first work piece is placed flush against the planar work surface of the base during the drilling step.

15. A drilling jig system comprising:
  a first planar work surface;
  a second planar work surface;
  wherein the plane of the first planar work surface is positioned in approximate perpendicular alignment to the plane of the second planar work surface;
  the first planar work surface configured to engage a planar face of a workpiece;
  the second planar work surface configured to engage a planer connecting surface of the workpiece;
  a first drill guide having a bore and a center axis;
  wherein the center axis of the first drill guide extends in an approximate perpendicular orientation through the first planar work surface;
  wherein the center axis of the first drill guide extends in an approximate parallel orientation with the second planar work surface;
  wherein an exit portion of the bore of the first drill guide intersects the second planar work surface;
  wherein the exit portion of the bore of the first drill guide is less than half of the circumference of the first drill guide;
  wherein when the face of the workpiece is aligned on the first planar work surface and the connecting surface of the workpiece is aligned on the second planar work surface the first drill guide is aligned such that more half of the bore of the first drill guide overlaps with face of the workpiece and the exit portion of the bore of the first drill guide extends past the connecting surface of the workpiece;
  wherein the first drill guide is configured to receive a drill bit therein;
  wherein the first drill guide is configured to allow the drill bit to rotate within the first drill guide;
  wherein the first drill guide is configured to allow the drill bit to move laterally along the center axis of the drill guide as the drill bit rotates so as to facilitate drilling a hole into the workpiece;
  wherein when the drill bit extends through the first drill guide and into the workpiece a hole is formed within the workpiece wherein more than half of the drill bit is received within the face of the workpiece and less than half of the drill bit exits the connecting surface of the workpiece.

16. The system of claim 15, further comprising:
  a second drill guide having a cylindrical bore and a center axis;
  wherein the center axis of the second drill guide extends in an approximate perpendicular orientation through the first planar work surface;
  wherein the center of the second drill guide extends in an approximate parallel orientation with the second planar work surface;
  wherein an exit portion of the second drill guide intersects the second planar work surface.

17. The system of claim 15, wherein the first drill guide is cylindrical in shape.

18. The system of claim 15, wherein the first drill guide includes a cut out area that facilitates dust collection.

19. The system of claim 15 wherein the first drill guide is formed of a hardened metallic material for increased durability and wear resistance whereas other portions of the jig are formed of a plastic material.

20. A drilling jig system for forming an infinity joint, the system comprising:
  a work surface;
  the work surface forming a plane;
  a drill guide;
  the drill guide having a center axis;
  the drill guide positioned such that the center axis of the drill guide extends through the plane of the work surface in a generally perpendicular orientation;
  a stop feature;
  the stop feature configured to engage a workpiece having a face and a connecting surface;
  wherein when the face of a workpiece is placed in engagement with the plane of the work surface, and the stop feature is engaged with the workpiece, the drill guide is positioned such that the center axis of the drill guide intersects with the face of the workpiece while less than half of the circumference of the drill guide extends beyond the connecting surface of the workpiece;
  wherein the drill guide is configured to receive a drill bit therein;
  wherein the drill guide is configured to allow the drill bit to rotate within the drill guide;
  wherein the drill guide is configured to allow the drill bit to move laterally along the center axis of the drill guide as the drill bit rotates so as to facilitate drilling a hole into a workpiece;
  wherein when the face of a workpiece is placed in engagement with the plane of the work surface, and the stop feature is engaged with the workpiece, and the drill bit is inserted into the drill guide more than half of the drill bit drills into the face of the workpiece while less than half of the drill bit exits the connecting surface of the workpiece.

21. A drilling jig system for forming an infinity joint, the system comprising:

a work surface;
the work surface forming a plane;
a drill guide;
the drill guide having a center axis;
the drill guide positioned such that the center axis of the drill guide extends through the plane of the work surface in a generally perpendicular orientation;
a stop feature;
the work surface and the stop feature configured to engage a workpiece having a face and a connecting surface;
wherein when the face of the workpiece is placed in engagement with the plane of the work surface, and the stop feature is engaged with the workpiece, the drill guide is positioned such that more than half of the drill guide overlaps with the face of the workpiece while less than half of the drill guide extends beyond the connecting surface of the workpiece;
wherein the drill guide is configured to receive a drill bit therein;
wherein the drill guide is configured to allow the drill bit to rotate within the drill guide; and
wherein the drill guide is configured to allow the drill bit to move laterally along the center axis of the drill guide as the drill bit rotates so as to facilitate drilling a hole into the workpiece.

* * * * *

UNITED STATES PATENT AND TRADEMARK OFFICE
CERTIFICATE OF CORRECTION

PATENT NO. : 10,328,498 B2
APPLICATION NO. : 14/685862
DATED : June 25, 2019
INVENTOR(S) : Clark et al.

Page 1 of 2

It is certified that error appears in the above-identified patent and that said Letters Patent is hereby corrected as shown below:

In the Claims

In Column 12, Line 32 should read as follows:
1. A drilling jig comprising: a base; the base having a planar work surface; an upright; the upright connected to the base; the upright having a planar work surface; wherein the planar work surface of the base is positioned in a generally perpendicular orientation to the planar work surface of the upright; a first drill guide having a center axis extending through the planar work surface of the upright in a generally perpendicular orientation; wherein the first drill guide is configured to receive a drill bit therein; wherein the first drill guide is configured to allow the drill bit to rotate within the first drill guide; wherein the first drill guide is configured to allow the drill bit to move laterally through the first drill guide as the drill bit rotates so as to facilitate drilling a hole into a workpiece; wherein the first drill guide is aligned to extend in a generally parallel orientation to the planar work surface of the base; wherein the first drill guide is positioned such that an exit portion of the first drill guide is below the planar work surface of the base; wherein the exit portion of the first drill guide intersects the planar work surface of the base; wherein the exit portion of the first drill guide is less than half of the circumference of the first drill guide.

In Column 13, Line 34 should read as follows:
15. A drilling jig system comprising: a first planar work surface; a second planar work surface; wherein the plane of the first planar work surface is positioned in approximate perpendicular alignment to the plane of the second planar work surface; the first planar work surface configured to engage a planar face of a workpiece; the second planar work surface configured to engage a planar connecting surface of the workpiece; a first drill guide having a bore and a center axis; wherein the center axis of the first drill guide extends in an approximate perpendicular orientation through the first planar work surface; wherein the center axis of the first drill guide extends in an approximate parallel orientation with the second planar work surface; wherein an exit portion of the bore of the first drill guide intersects the second planar work surface; wherein the exit portion of the bore of the first drill guide is less than half of the circumference of the first drill guide; wherein when the face of the workpiece is aligned on the first planar work surface and the connecting surface of the workpiece is aligned on the second planar work surface the first drill guide is aligned such that more half of the Signed and Sealed this
Twentieth Day of August, 2019

Andrei Iancu
*Director of the United States Patent and Trademark Office* bore of the first drill guide overlaps with face of the workpiece and the exit portion of the bore of the first drill guide extends past the connecting surface of the workpiece; wherein the first drill guide is configured to receive a drill bit therein; wherein the first drill guide is configured to allow the drill bit to rotate within the first drill guide; wherein the first drill guide is configured to allow the drill bit to move laterally along the center axis of the drill guide as the drill bit rotates so as to facilitate drilling a hole into the workpiece; wherein when the drill bit extends through the first drill guide and into the workpiece a hole is formed within the workpiece wherein more than half of the drill bit is received within the face of the workpiece and less than half of the drill bit exits the connecting surface of the workpiece.

In Column 14, Line 12 should read as follows:
16. The system of claim 15, further comprising: a second drill guide having a cylindrical bore and a center axis; wherein the center axis of the second drill guide extends in an approximate perpendicular orientation through the first planar work surface; wherein the center axis of the second drill guide extends in an approximate parallel orientation with the second planar work surface; wherein an exit portion of the second drill guide intersects the second planar work surface.